(12) United States Patent
Karschnia et al.

(10) Patent No.: US 7,228,186 B2
(45) Date of Patent: Jun. 5, 2007

(54) FIELD-MOUNTED PROCESS DEVICE WITH PROGRAMMABLE DIGITAL/ANALOG INTERFACE

(75) Inventors: Robert J. Karschnia, Chaska, MN (US); Marcos Peluso, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 191 days.

(21) Appl. No.: 11/070,864

(22) Filed: Mar. 2, 2005

(65) Prior Publication Data

US 2005/0195093 A1 Sep. 8, 2005

Related U.S. Application Data

(63) Continuation-in-part of application No. 10/760,793, filed on Jan. 20, 2004, now Pat. No. 6,961,624, which is a continuation of application No. 10/400,148, filed on Mar. 26, 2003, now Pat. No. 6,711,446, which is a continuation of application No. 09/570,268, filed on May 12, 2000, now Pat. No. 6,574,515.

(60) Provisional application No. 60/549,599, filed on Mar. 2, 2004.

(51) Int. Cl.
*G05B 11/01* (2006.01)
*G05B 9/02* (2006.01)
*G05B 19/18* (2006.01)

(52) U.S. Cl. .................. 700/19; 700/2; 700/9; 700/11; 700/79; 710/11; 710/12; 710/16; 710/105; 714/6; 714/11; 370/410; 370/437; 370/468; 370/493

(58) Field of Classification Search ................ 700/1–3, 700/27–30, 19–20, 9–11, 17, 79, 83, 37; 710/11, 12, 16, 105; 714/6, 11; 370/410, 370/437, 493, 468

See application file for complete search history.

(56) References Cited

U.S. PATENT DOCUMENTS 3,764,983 A    10/1973   Stok ........................... 340/150

(Continued)

FOREIGN PATENT DOCUMENTS

DE    40 21 258    1/1991

(Continued)

OTHER PUBLICATIONS

Hohenstein et al., "Smart, Modular I/O Systems Increase Intrinsic Safety Options," I & CS—Industrial and Process Control Magazine, Chilton Company, Randor, Pennsylvania, vol. 69, No. 10, Oct. 1996.

(Continued)

*Primary Examiner*—Ramesh Patel
(74) *Attorney, Agent, or Firm*—Westman, Champlin & Kelly, P.A.

(57) ABSTRACT

Embodiments of the present invention generally provide a field-mountable process device that receives digital information from one or more process devices, and provides an associated analog output. Embodiments of the present invention include providing a wireless interface to the field-mounted process device such that configuration and/or diagnostic information can be communicated between the field-mounted process device and one or more additional devices. In some embodiments, the field-mounted process device can be completely powered by the digital process communication loop to which it is coupled. Finally, embodiments of the present invention also include generating and storing within the field-mounted process device a mapping between one or more field devices communicating in accordance with a digital process communication protocol and an analog output of the field-mounted process device.

21 Claims, 8 Drawing Sheets

U.S. PATENT DOCUMENTS

| | | | |
|---|---|---|---|
| 3,872,389 A | 3/1975 | Willard | 328/137 |
| 4,122,719 A | 10/1978 | Carlson et al. | 72/342 |
| 4,206,443 A | 6/1980 | Britton | 340/147 |
| 4,243,931 A | 1/1981 | dela Cruz | 323/302 |
| 4,356,475 A | 10/1982 | Neumann et al. | 340/521 |
| 4,413,314 A | 11/1983 | Slater et al. | 341/20 |
| 4,484,190 A | 11/1984 | Bedard | 340/825.57 |
| 4,678,937 A | 7/1987 | Price | 307/311 |
| 4,739,183 A | 4/1988 | Tokura et al. | 307/9 |
| 4,816,825 A | 3/1989 | Chan et al. | 340/528.5 |
| 4,818,994 A | 4/1989 | Orth et al. | 340/870.21 |
| 4,910,658 A | 3/1990 | Dudash et al. | 340/3.54 |
| 4,936,690 A | 6/1990 | Goetzinger | 374/181 |
| 4,994,788 A | 2/1991 | Philippe et al. | 340/505 |
| 5,008,662 A | 4/1991 | Tokizane et al. | 340/825.06 |
| 5,223,826 A | 6/1993 | Amou et al. | 340/825.06 |
| 5,307,346 A | 4/1994 | Fieldhouse | 370/254 |
| 5,333,114 A * | 7/1994 | Warrior et al. | 700/67 |
| 5,495,769 A | 3/1996 | Broden et al. | 73/718 |
| 5,551,053 A | 8/1996 | Nadolski et al. | 395/829 |
| 5,706,007 A | 1/1998 | Fragnito et al. | 341/155 |
| 5,713,668 A | 2/1998 | Lunghofer et al. | 374/179 |
| 5,737,543 A | 4/1998 | Gavin et al. | 710/105 |
| 5,764,891 A * | 6/1998 | Warrior | 710/72 |
| 5,825,664 A | 10/1998 | Warrior et al. | 364/550 |
| 5,876,122 A | 3/1999 | Eryurek | 374/183 |
| 5,936,514 A * | 8/1999 | Anderson et al. | 323/234 |
| 5,960,214 A | 9/1999 | Sharpe et al. | 710/15 |
| 5,963,147 A | 10/1999 | Westfield et al. | 340/870.11 |
| 5,980,078 A | 11/1999 | Krivoshein et al. | 700/1 |
| 6,014,612 A * | 1/2000 | Larson et al. | 702/183 |
| 6,016,523 A | 1/2000 | Zimmerman et al. | 710/63 |
| 6,026,352 A | 2/2000 | Burns et al. | 700/1 |
| 6,035,240 A | 3/2000 | Moorehead et al. | 700/2 |
| 6,047,222 A * | 4/2000 | Burns et al. | 700/79 |
| 6,052,655 A | 4/2000 | Kobayashi et al. | 702/184 |
| 6,088,665 A | 7/2000 | Burns et al. | 702/188 |
| 6,094,600 A | 7/2000 | Sharpe et al. | 700/19 |
| 6,104,875 A | 8/2000 | Gallagher et al. | 717/166 |
| 6,192,281 B1 * | 2/2001 | Brown et al. | 700/2 |
| 6,275,881 B1 | 8/2001 | Doege et al. | 710/102 |
| 6,304,934 B1 | 10/2001 | Pimenta et al. | 710/129 |
| 6,377,859 B1 * | 4/2002 | Brown et al. | 700/79 |
| 6,574,515 B1 * | 6/2003 | Kirkpatrick et al. | 700/19 |
| 6,711,446 B2 * | 3/2004 | Kirkpatrick et al. | 700/19 |
| 6,961,624 B2 * | 11/2005 | Kirkpatrick et al. | 700/19 |
| 7,016,741 B2 * | 3/2006 | Arntson | 700/19 |
| 2002/0010518 A1 | 1/2002 | Reid et al. | |
| 2005/0288799 A1 * | 12/2005 | Brewer et al. | 700/1 |

FOREIGN PATENT DOCUMENTS

| | | |
|---|---|---|
| DE | 42 27 577 | 2/1994 |
| DE | 297 20 492 U1 | 2/1998 |
| DE | 198 24 146 | 12/1999 |
| EP | 0 490 864 | 6/1992 |
| EP | 0 589 849 | 3/1994 |
| EP | 0 591 926 | 4/1994 |
| EP | 0 601 344 A1 | 6/1994 |
| EP | 0 666 631 A2 | 1/1995 |
| EP | 1 435 552 | 7/2004 |
| GB | 2 329 039 | 3/1999 |
| JP | 52-108194 | 9/1977 |
| JP | 07162345 A | 6/1995 |
| WO | WO 2004/042674 | 5/2004 |

OTHER PUBLICATIONS

Copy of the Search Report and Written Opinion in PCT/US2005/006760, filed Sep. 13, 2005.

"Remote Terminal Units for Distributed Control and Data Acquisition", Arcom Control Systems, 1995, (brochure).

"Field Bus Interface Products for Distributed Control and Data Acquisition", Arcom Control Systems, 1995 (brochure).

"Communications Gateway Products for Distributed Control and Data Acquisition", Arcom Control Systems, 1995 (brochure).

"Developing Process Systems Using Hart", Arcom Control Systems, 1992, pp. 3-22.

"Digital Data Communication, Control and Maintenance," by W. Van Der Bijl, *Journal A*, vol. 34, No. 1, 1993, pp. 19-23.

"SMV 3000 Smart Mulrivariable Transmitter: The Four-In-One Transmitter and Flow Computer," Honeywell Inc., Nov. 1995 (brochure).

"Multivariable Analog Interface for Smart Transmitters," by S. Oxenberg et al., Symposium '96, pp. 1-7.

"Fieldbus In TotalPlant Solutions," by P. Griem et al., Symposium '96, pp. 1-7.

SMV 3000 Multivariable Pressure Transmitter: Release 150 Enhancements, by R. Harvey et al., pp. 1-7.

Materials from www.honeywell.com Internet Site dated Sep. 16, 1996.

"Multivariable Trip Switch For Smart Transmitters," Vektron Corporation, Jan. 9, 1997, (Brochure).

Innovation Awards, *FC*, Feb. 1997.

SMV 3000 Smart Multivariable Transmitter, Honeywell, 1995, pp. 1-11.

"Use of Smart Multivariable Transmitters for Combustion Air Flow Measurement," by M. Cushing, *ISA*, 1996, pp. 221-229.

Exhibit and Product Guide to ISA 96, *I&CS*, Sep. 1996.

"The New SMV 3000 Solves the Mystery of Flow," Honeywell.

D5000 Series Users Manual, 23 pages, Revised Jan. 1, 1998.

"ACE pc," Arcom Control Systems, 1 page dated Feb. 23, 2000, downloaded from http://www.arcom.co.uk/products/iep/systems/ace/default.htm.

"Model 848T Eight Input Temperature Transmitter With FOUNDATION™ Fieldbus", *Product Data Sheet 00813-0100-4697*, Mar. 2003.

"Smart Transmitter (HART Protocol) Interface Products," 1770 Communication Products, 2 pages dated Apr. 26, 1999, downloaded from http://www.ab.com/catalogs/html/bll2/io/smart.html.

Office Action from the Chinese Patent Office in related Chinese application.

"Advanced Systems Simplify Control," Machine Design, Penton, Inc., vol. 68, Nr. 12, pp. 118, 120 (Jul. 11, 1996).

Babb, M., "Looking Around for More Work To Do," Control Engineering International, vol. 43, Nr. 14, pp. 59-60, 62 (Oct. 1996).

"Transducer Interfacing Handbook," A Guide to Analog Signal Conditioning, by Daniel H. Sheingold, 5 pages (1980).

"Smart Head and Rail Mount Temperature Transmitters," Models 644H and 644R, Fisher-Rosemount Managing the Process Better, pp. 37-52 (1998).

"Smart Temperature Transmitter," Models 3144 and 3244MV, Fisher-Rosemount Managing the Process Better, pp. 19-36 (1998).

Observations by Third Party filed in related European Application including Translation.

Instruction Manual FD0-BI-Ex12.PA, German language document, and apparent English equivalent Part No.: 107591, Jan. 24, 2001.

Universal temperature multiplexer for Foundation Fieldbus, Universal converter, analogue, F2D0-TI-Ex8.FF, 2003.

Valve Coupler for Foundation Fieldbus, Manual FD0-VC-Ex4.FF, Nov. 22, 2000.

PROFIBUS-PA Valve Coupler Filed Box, 2002 IS Catalog, 2002.

PROFIBUS-PA Sensor Interface Field Box, 2002 IS Catalog, 2002.

EC-Type Examination Certificate for FD0-VC-Ex4.Pa dated Dec. 18, 1998 (German Language document and apparent English translation).

Supplement to EC-Type Examination Certificate for FD0-VC-Ex.Pa dated Sep. 18, 2000 (German Language document and apparent English translation).

Supplement to EC-Type Examination Certificate for FD0-VC-Ex4. Pa dated Sep. 21, 2000 (German Language document and apparent English translation).

1st Amendment to EC-Type Examination Certificate for FD0-VC-Ex4.Pa dated Dec. 22, 1999 (German Language document and apparent English translation).

"Pressure Transmitters: LD302 Fieldbus Pressure Transmitter Series," http://www.advmnc.com/Smar/smar/smarfield.html., pp. 1-8.

"Rosemount 848L Logic Transmitter with FOUNDATION™ Fieldbus," Product Data Sheet, Jul. 2004, pp. 1-8.

* cited by examiner

FIELD-MOUNTED PROCESS DEVICE WITH PROGRAMMABLE DIGITAL/ANALOG INTERFACE

CROSS-REFERENCE TO RELATED APPLICATIONS

The present application is based on and claims the benefit of U.S. Provisional Patent application Ser. No. 60/549,599, filed Mar. 2, 2004, and entitled WIRELESS PROCESS DEVICE, the content of which is hereby incorporated by reference in its entirety; and the present application is a continuation-in-part application of and claims priority of U.S. patent application Ser. No. 10/760,793, filed Jan. 20, 2004, entitled TWO-WIRE FIELD-MOUNTED PROCESS DEVICE, which is a continuation of and claims priority to U.S. patent application Ser. No. 10/400,148, filed Mar. 26, 2003, entitled TWO-WIRE FIELD-MOUNTED PROCESS DEVICE, now U.S. Pat. No. 6,711,446, which is a continuation of and claims priority to U.S. patent application Ser. No. 09/570,268, filed May 12, 2000, now U.S. Pat. No. 6,574,515, the content of which is hereby incorporated by reference in its entirety.

BACKGROUND OF THE INVENTION

The present invention relates to process devices. More specifically, the present invention relates to field-mounted process control and measurement devices.

Process devices are used to measure and control industrial processes such as the refining of petrochemicals, the processing of food, and a number of other processes. Process measurement devices include process variable transmitters, which measure a process variable such as pressure or temperature and communicate the measured variable to a process controller. Another type of process device is an actuator, such as a valve controller or the like. Generally, process control is accomplished using a combination of transmitters, actuators, and a process controller that communicate across a process control loop. Both types of process devices interact with the physical process through process interface elements. Process interface elements are devices which relate electrical signals to physical process conditions, and include devices such as sensors, limit switches, valve controllers, heaters, motor controllers, and a number of other devices.

The process controller is typically a microcomputer located in a control room away from the process. The controller can receive process information from the process measurement devices and apply a suitable control signal to one or more process control devices to influence the process and thereby control it.

In order to couple to the process, transmitters and actuators are generally mounted near the process in the field. Such physical proximity can subject the process devices to an array of environmental challenges. For example, process devices are often subjected to temperature extremes, vibration, corrosive and/or flammable environments, and electrical noise. In order to withstand such conditions, process devices are designed specifically for "field-mounting." Such field-mounted devices utilize robust enclosures, which can be designed to be explosion-proof. Further, field-mounted process devices can also be designed with circuitry that is said to be "intrinsically safe", which means that even under fault conditions, the circuitry will generally not contain enough electrical energy to generate a spark. Further still, electrical isolation techniques are usually employed to reduce the effects of electrical noise. These are just a few examples of design considerations, which distinguish field-mounted process devices from other devices, which measure sensor characteristics and provide data indicative of such characteristics.

Aside from the environmental considerations listed above, another challenge for field-mounted devices is that of wiring. Since process devices are located near the process far from the control room, long wire runs are often required to couple such devices to the control room. These long runs are costly to install and difficult to maintain.

One way to reduce the requisite wiring is by using two-wire process devices. These devices couple to the control room using a two-wire process control loop. Two-wire devices receive power from the process control loop, and communicate over the process control loop in a manner that is generally unaffected by the provision of power to the process device. Techniques for communicating over two-wires include 4–20 mA signaling, the Highway Addressable Remote Transducer (HART®) Protocol, FOUNDATION™ Fieldbus, and others. Although two-wire process control systems provide wiring simplification, such systems provide a limited amount of electrical power to connected devices. For example, a device that communicates in accordance with 4–20 mA signaling must draw no more than 4 mA otherwise the device's current consumption would affect the process variable. The frugal power budget of two-wire process devices has traditionally limited the functionality that could be provided.

While the development of field devices that communicate digitally over a process communication loop has marked a significant advance in the art of process industry measurement and control, there remains a significant difficulty. Specifically, many installations of field-mounted process devices have tens if not hundreds of various process devices coupled to the process at various locations and interacting with the process under the control of one or more controllers.

In the not too distance past, all field devices were analog-based field devices. Thus, at one point, the process industry applications had, or still have, a significant investment in a vast array of analog-based process field devices. Even in the advent of significantly advanced digital devices, such as those that communicate in accordance with the FOUNDATION™ Fieldbus process communication protocol, owners of analog installations are somewhat frustrated from simply adopting the new technology due to the time and investment involved in switching over their entire installation to the new technology.

There exists a significant need in the art to provide a device or system that facilitates implementation of digital process control and measurement technology without requiring an owner of such an installation to completely adapt their system to the new technology.

SUMMARY

Embodiments of the present invention generally provide a field-mountable process device that receives digital information from one or more process devices, and provides an associated analog output. Embodiments of the present invention include providing a wireless interface to the field-mounted process device such that configuration and/or diagnostic information can be communicated between the field-mounted process device and one or more additional devices. In some embodiments, the field-mounted process device can be completely powered by the digital process communication loop to which it is coupled. Finally, embodiments of the present invention also include generating and storing within the field-mounted process device a mapping between one or more field devices communicating in accordance with a digital process communication protocol and an analog output of the field-mounted process device.

DETAILED DESCRIPTION OF THE PREFERRED EMBODIMENTS

Figure 1:
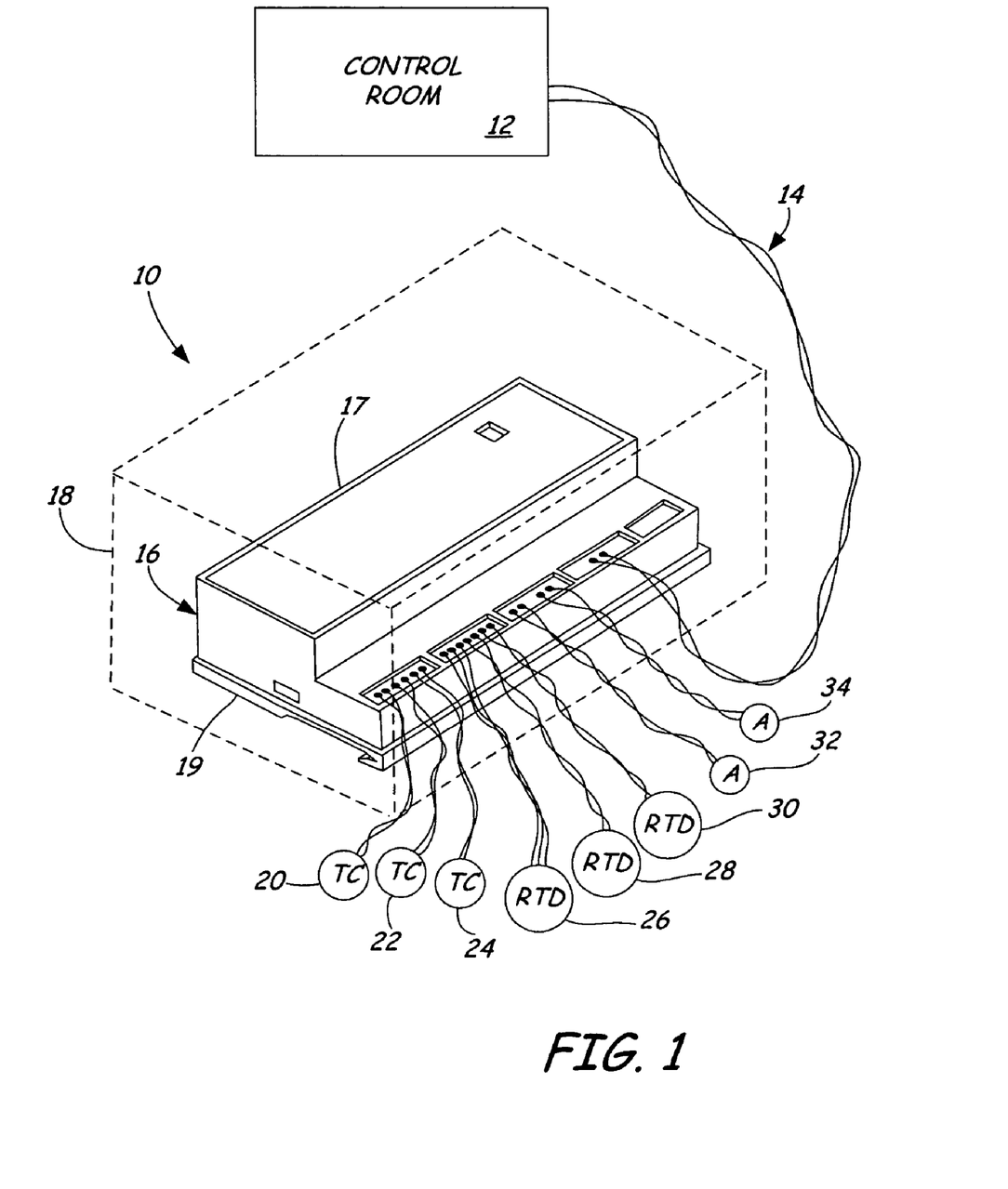
FIG. 1 is a diagrammatic view of a process control system employing a two-wire field mounted process device in accordance with an embodiment of the present invention.

A two-wire field mountable process device 16 shown in FIG. 1 is provided which can be adapted to execute sophisticated user generated control algorithms, much like those used with traditional programmable logic controllers. Embodiments can include input channels, output channels, and any combination of the two. Generally, each channel is isolated from the remainder of the process device. Such isolation removes ground loop errors that currently limit multiple input transmitters. Finally, power management is such that embodiments of the present invention are wholly powered by a two-wire process loop 14. These and other features will become apparent upon review of the figures and the related description provided below.

FIG. 1 is a diagrammatic view of process control system 10 which includes control room 12, process control loop 14 and process device 16. Process control system can comprise a single process device coupled to control room 12, however system 10 can also include hundreds of process devices coupled to one or more control rooms over a number of process control loops.

Control room 12 is typically a facility located away from device 16 that includes a microcomputer. A user stationed in control room 12 uses the microcomputer to interact with various process devices through process control loop 14 and thus controls the process(es) from the control room. For clarity, control room 12 is illustrated as a single block. However, in some control system embodiments, control room 12 may in fact couple process control loop 14 to a global computer network, such as the internet, so that users worldwide could access process device 16 from traditional web browser software.

Loop 14 is a two-wire process control loop. A number of two-wire process communication protocols exist for communicating on loop 14, and any suitable protocol can be used. For example, the HART® protocol, the FOUNDATION™ Fieldbus protocol, and the Profibus-PA protocol can be used with embodiments of the present invention. Loop 14 provides power to connected process devices while providing communication between the various devices.

Process device 16 includes cover 17 and base 19 which are preferably constructed from a suitable plastic material. Base 19 is adapted to mate with an industry standard DIN rail for mounting. As will be described in more detail, device 16 is adapted to operate solely upon electrical power received through loop 14, and is adapted for field-mounting. Thus, device 16 is configured to withstand a relatively large temperature range (such as −40 to 85 deg. C.), mechanical vibrations, and relative humidity in excess of 90%. Such environmental resistance is effected primarily through the selection of robust components, as will be described later in the specification. Optional enclosure 18 (shown in phantom) provides added durability and can be any known enclosure such as a National Electrical Manufacturers Association (NEMA) enclosure, or an explosion-proof enclosure. The process device embodiment shown in FIG. 1 has a number of inputs and outputs, and includes suitable computing circuitry (shown in FIG. 2) to execute a user generated control algorithm. The algorithm is comprised of a number of logic statements relating specific input events to outputs controlled by device 16. The user can change the algorithm either by interfacing locally with device 16, or by communicating with device 16 over control loop 14. The algorithm can be generated using conventional logic generation software such as Relay Ladder Logic and Sequential Function Charts (SFC's). In this sense, device 16 can be considered a two-wire field-mountable programmable logic controller. Although the description will focus upon the embodiment shown in FIGS. 1 and 2, such description is provided for clarity, since embodiments employing solely inputs, or outputs are expressly contemplated. Traditionally devices with the computational power of device 16 could not be operated upon two-wire process control loops due to prohibitive power constraints.

Process device 16 is coupled to sensors 20, 22, 24, 26, 28 and 30 as well as actuators 32 and 34. Sensors 20, 22 and 24 are thermocouples, of known type, which are coupled to various process points to provide voltage signals based upon process variables at the respective process points. Resistance Temperature Devices (RTD's) 26, 28 and 30 are also coupled to various process points and provide a resistance that is based upon process temperature at the respective process points. RTD 26 is coupled to device 16 through a known three-wire connection and illustrates that various wiring configurations can be used with embodiments of the present invention. Actuators 32 and 34 are coupled to process device 16 and actuate suitable valves, switches and the like based upon control signals from device 16. As noted above, device 16 can execute a user generated control algorithm to relate specific input conditions to specific output commands. For example, device 16 may sense a process fluid temperature, and cause actuator 32 to engage a heater coupled to the process fluid in order to maintain the fluid temperature at a selected level.

Figure 2:
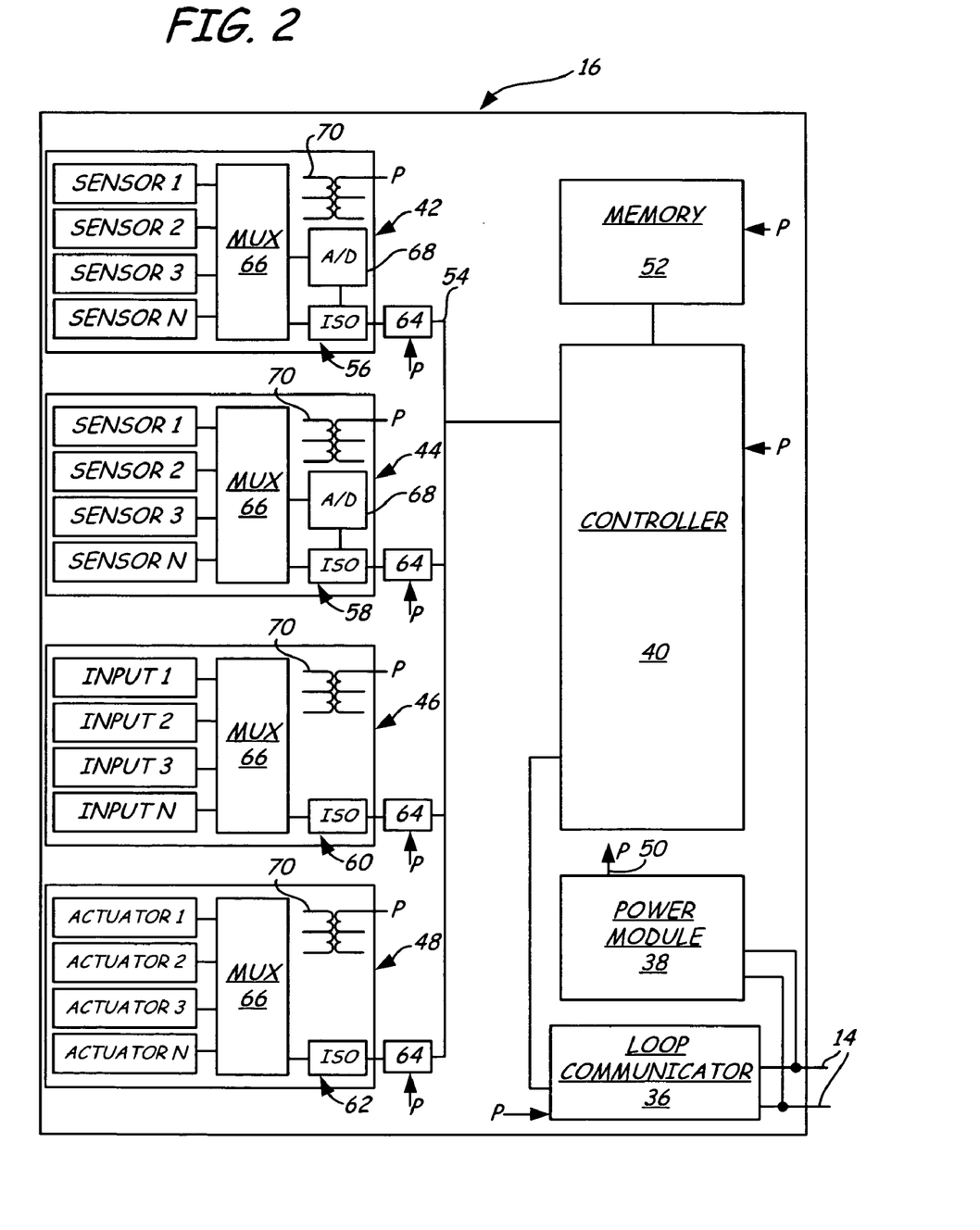
FIG. 2 is a system block diagram of the process device shown in FIG. 1.

FIG. 2 is a system block diagram of device 16 shown in FIG. 1. Device 16 includes loop communicator 36, power module 38, controller 40, and channels 42, 44, 46, 48, and memory 52. Loop communicator 36 is coupled to process control loop 14 and is adapted for bi-directional data communication over loop 14. Loop communicator 36 can include a known communication device such as a traditional FOUNDATION™ Fieldbus communication controller or the like. Additionally, communicator 36 can include suitable isolation circuitry to facilitate compliance with the intrinsic safety specification as set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988.

Power module 38 is coupled to loop 14 such that power module 38 provides power to all components of device 16 based upon power received from loop 14. Although power module 38 has a single arrow 50 indicating that power module 38 provides power to all components, it is noted that such power can be provided at multiple voltages. For example, power module 38 preferably includes a switching power supply that provides electrical power at a plurality of voltages. Thus, some components such as the A/D converters and the isolators can receive a higher voltage such as 4.9 volts, while low-power components such the controller 40, memory 52 and loop communicator 36 receive a lower voltage such as 3.0 volts. Additionally, power module 38 is preferably programmable to such an extent that at least one of the voltages provided can be varied based. The selectable nature of power module 38 facilitates power management, which will be described later in the specification.

Controller 40 is coupled to memory 52 and executes program instructions stored therein. Memory 52 is preferably low-power memory operating on 3.0 volts, such as the model LRS 1331, available from Sharp Electronics. Additionally, memory 52 can be "stacked" memory in which both flash memory and volatile memory are provided on a single memory module. The user generated control algorithm, or "program" executed by controller 40 can be changed by a user either by coupling to device 16 locally, or by accessing device 16 through loop 14. In some embodiments the program includes instructions that relate process event inputs to outputs determined by controller 40. In this sense, device 16 functions similarly to a programmable logic controller, which is a device that typically has not been robust enough for field-mounting, nor able to operate on the low power levels of two-wire field devices. However, by so providing the functions of a programmable logic controller, much more sophisticated process control algorithms can be implemented through a user friendly interface, such as Relay Ladder Logic or the like.

Controller 40 receives power from module 38, and communicates with loop communicator 36. Controller 40 preferably includes a low-power microprocessor such as the model MMC 2075 microprocessor available from Motorola Inc. of Schaumburg, Ill. Additionally, controller 40 preferably has a selectable internal clock rate such that the clock rate of controller 40, and thus the computing speed and power consumption, can be selected through suitable commands sent to device 16 over loop 14. Since higher clock speeds will cause controller 40 to draw more power, clock selection of controller 40, and selection of the voltage level provided by power module 38 to controller 40 are preferably performed in tandem. In this manner the processing speed and power consumption of device 16 are selectable and vary together.

Controller 40 is coupled to the various channels through interface bus 54, which is preferably a serial bus designed for high speed data communication such as a Synchronous Peripheral Interface (SPI). Channels 42, 44, 46 and 48 are coupled to bus 54 through communication isolators 56, 58, 60 and 62, respectively, which are preferably known optoisolators, but which can be any suitable isolation devices such as capacitors. In some embodiments, channels 42, 44, 46 and 48 provide data in parallel form, and parallel-serial converters 64 are used to translate the data between serial and parallel forms. Preferably, converters 64 are Universal Asynchronous Receiver/Transmitters (UART's).

Channel 42 is coupled to controller 40, and includes sensor terminals 1–n, multiplexer (MUX) 66, analog-to-digital (A/D) converter 68, communication isolator 56, and power isolator 70. It is contemplated that communication isolator 56, and power isolator 70 can be combined in a single circuit. Channel 42 is specifically adapted to measure a specific sensor type such as thermocouples, resistance temperature devices, strain gauges, pressure sensors, or other sensor type. Each sensor terminal is adapted to couple a single sensor, such as a thermocouple, to multiplexer 66. Multiplexer 66 selectively couples one of the sensors to A/D converter 68 such that a characteristic of the sensor (voltage for a thermocouple) is measured and communicated to controller 40 through isolator 56 and UART 64. Power for channel 42 is received from power module 38 through power isolator 70. Power isolator 70 is preferably a transformer, but can be any suitable device. Those skilled in the art will appreciate that communication isolator 56 and power isolator 70 cooperate to ensure that channel 42 is electrically isolated from the rest of device 16.

Channel 44 is similar to channel 42, and like components are numbered similarly. Preferably, channel 44 is configured to measure sensors of a different type than that of channel 42. For example, in one embodiment, channel 42 is configured to measure the voltage of thermocouples, and channel 44 is configured to measure the resistance of RTD's. Each sensor terminal in channel 44 is thus configured to couple to an RTD in a two, three, or four-wire (Kelvin) connection. Because channels 42 and 44 are each electrically isolated from the rest of device 16, coupling a first independently grounded sensor to channel 42, and a second independently grounded sensor to channel 44 does not result in the generation of undesirable ground loop errors. Additionally, since each channel is designed for a specific type of sensor, parameters such as A/D precision and conversion rate can be tailored for the specific sensor type. For example, a channel designed for high-precision may employ an A/D converter configured to have a very high accuracy, but having a relatively slower conversion time. Conversely, a channel designed for sensors that measure a process variable that can changes quickly can employ a lower precision high speed A/D converter. Essentially, any sensor input can be switched between operation with resistance-type sensors to operation with voltage-type sensors based upon configuration information received from controller 40. Controller 40 can provide the configuration information based upon information received over loop 14, or through a local input (not shown). Additionally, controller 40 can provide configuration information to the channels to adjust the analog-to-digital sampling rates for each channel, or even for each sensor. This is particularly advantageous where sensor rates of change are anticipated based upon information know about the process.

Channel 46 is similar to channels 42 and 44, however since channel 46 is configured to receive digital inputs, it does not include an analog-to-digital converter. As illustrated, inputs 1–n are coupled to multiplexer 66 which conveys the signal of a selected input to bus 54 through communication isolator 60 and UART 64. In some embodiments, the input level may be such that the digital inputs could be provided directly to UART 64 through isolator 60. Digital inputs are generally indicative of logic-type signals such as contact closure in limit switches as the like. However, digital inputs 1–n can also be coupled to digital outputs of other process devices such that the inputs represent logic signals such as alarms or other Boolean type signals.

Channel 48 is similar to channel 46, but essentially operates in reverse compared to channel 46. Thus, serial information sent to channel 48 through the UART is converted into parallel form, and conveyed across communication isolator 62 to set individual actuator outputs. Thus, logic signals are sent to the terminals labeled ACTUATOR 1–n to cause actuators coupled to such terminals (not shown) to engage or disengage as desired. Such actuators can be any suitable device such as valve controllers, heaters, motor controllers and any other suitable device. Essentially, any device that is addressable based upon a logic type output is an actuator.

Figure 3:
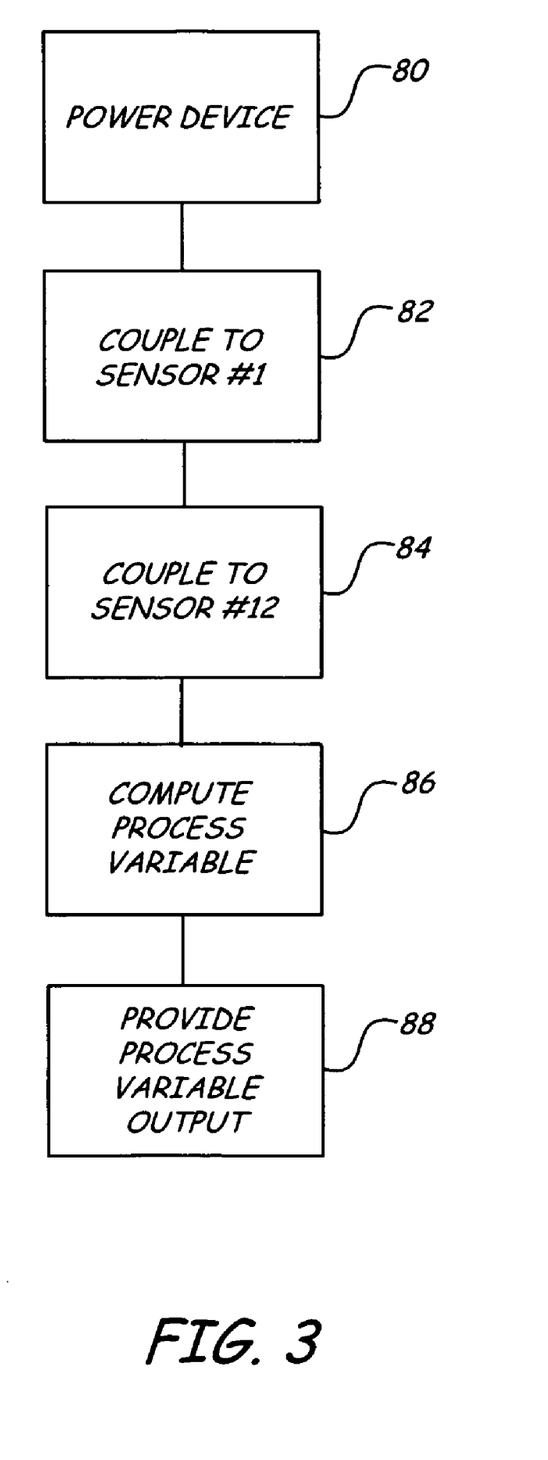
FIG. 3 is a system block diagram of a method of providing a process variable with a field-mounted process device in accordance with an embodiment of the present invention.

FIG. 3 is a system block diagram of a method of providing a process variable with a field-mounted process device in accordance with an embodiment of the present invention. The method begins at block 80 where a field-mountable process device is wholly powered by a two-wire process control loop. At block 82, the process device is coupled to a first sensor through a first isolated input channel. A sensor signal is acquired through the first isolated input channel, which signal is indicative of a process variable. At block 84, the process device is coupled to a second sensor through a second isolated input channel in order to acquire a second sensor signal. Since the first and second input channels are isolated, independent grounding of the first and second sensors will not cause undesirable ground loop errors. At block 86, the process device computes a process variable based upon one or both of the sensor signals. Moreover, although the method is described with respect to two sensors, a number of additional sensors could be used such that the process variable would be a function of any number of sensor signals. For example, the process device could average the values of the sensor, provide their difference, standard deviation, or any other appropriate function. At block 88, the computed process variable is output. Such output can be in the form of information sent over the process control loop, a local display, or a local output effected through an output channel.

Figure 4:
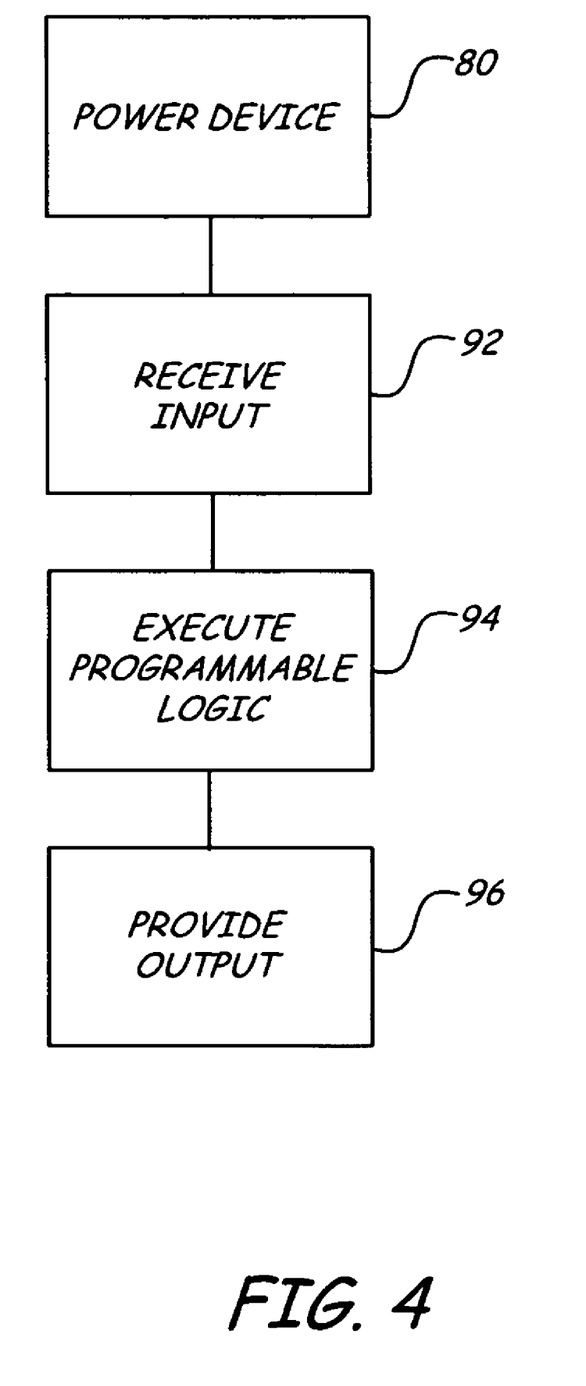
FIG. 4 is a system block diagram of a method of operating a field-mounted process device in accordance with an embodiment of the present invention.

FIG. 4 is a system block diagram of a method of operating a field mounted process device in accordance with an embodiment of the present invention. At block 80, the device is wholly powered by the two-wire process control loop. At block 92, the device receives an input. Such input can be in the form of signals received through input channels such as the multiple isolated input channels described above, in the form of process information received through the two-wire process control loop, in the form of a local input, or any combination of input signals and information. At block 94, the device executes user-programmable logic to relate the input information to one or more process outputs. The user-programmable logic can be simple or complex algorithms such as ladder logic, SFC's, fuzzy logic, Adaptive Control, or neural networks and the like. At block 96, the device provides the output determined via operation of the user-programmable logic. The output can be a local output, either digital or analog, or the output can be sent as information over the two-wire process control loop.

Figure 5:
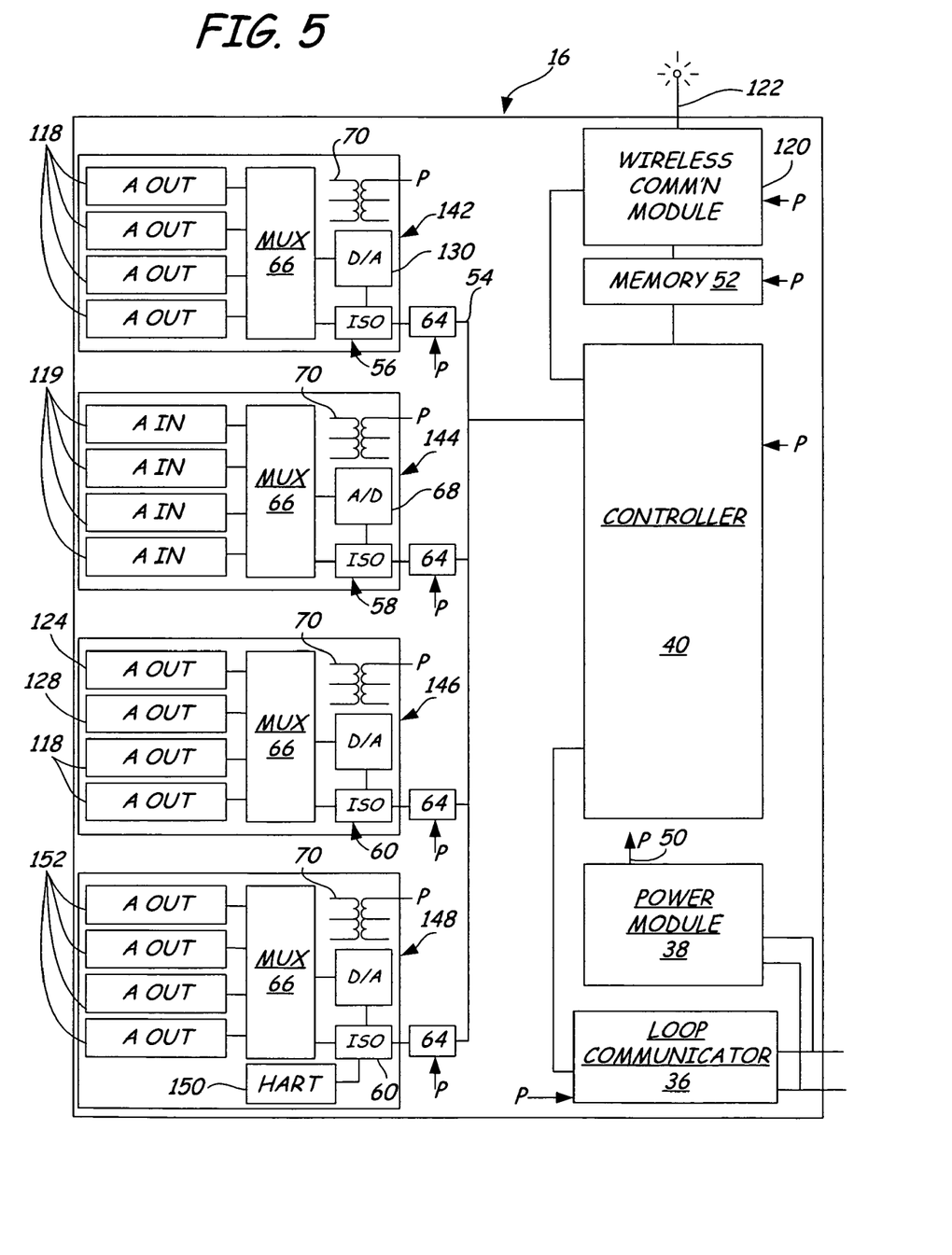
FIG. 5 is a system block diagram of a field-mountable process device in accordance with an embodiment of the present invention.

FIG. 5 is a system block diagram of a field-mountable process device in accordance with an embodiment of the present invention. Field-mountable process device 116 bears many similarities to device 16, and like components are numbered similarly. The main difference between device 116 and device 16 is that device 116 is configured to have a number of analog outputs 118 that are configured to generate an analog output signal based upon a control signal received from controller 40. Each of channels or modules 142, 144, 146 and 148 is preferably isolated from the rest of device 116. One type of analog signal that is highly useful is the generation or control of a 4–20 mA signal. This is because many older process devices and control systems communicate a process variable as a current value ranging between 4 and 20 mA.

Module 142 includes four analog outputs 118 that are coupled to digital-to-analog converter 130 through multiplexer 66. Digital-to-analog converter 130 can be any device that receives a digital signal from controller 40 and responsively generates an analog output related to the digital input. Multiplexer 66 is in communication with controller 40 and selectably couples one or more selected analog outputs 118 to digital-to-analog converter 130.

Module 144 is similar to the analog input modules described above. However, each of analog inputs 119 is configured to receive a current flow therethrough. Multiplexer 66 couples analog-to-digital converter 68 to one or more inputs 119 as selected by controller 40. Analog-to-digital converter 68 provides an indication to controller 40 related to current flowing through a selected input 119. The use of 4–20 mA analog inputs allows device 116 to receive analog control signals, or process variable information and adapt, or otherwise modify its operation based upon the received analog input. In this manner, device 116 can receive analog information, such as a setpoint, from an analog Distributed Control System (DCS). Alternately, if such information could also be conveyed to device 116 through wireless communication module 120, which will be described in greater detail below. This also allows a DCS to send signals to final control elements, with such signals being either analog or radio-frequency digital signals.

Module 148 is similar to analog output modules 142 and 148 with one important difference. Module 148 includes Highway Addressable Remote Transducer (HART) communication chip 150. HART is a hybrid protocol in which a digital signal is superimposed upon an analog signal such as a 4–20 mA current signal. HART is a known process industry standard communication protocol. Each of analog outputs 152 can be coupled to a HART device. Although FIG. 5 illustrates a field-mountable process device having 2 analog output modules, an analog input module, and a HART module, other combinations can be used in accordance with embodiments of the present invention.

Device 116 also preferably includes wireless communication module 120 that transmits and/or receives wireless data through antenna 122. Wireless communication module 120 is coupled to controller 40 and interacts with external wireless devices via antenna 122 based upon commands and/or data from controller 40. Wireless communication module 120 can communicate process-related information as well as device-related information. Depending upon the application, wireless communication module 120 may be adapted to communicate in accordance with any suitable wireless communication protocol including, but not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating rage of one another. Such collision prevention can include using a number of different radio-frequency channels and/or spread spectrum techniques.

Wireless communication module 120 can also include transducers for a plurality of wireless communication methods. For example, primary wireless communication could be performed using relatively long distance communication methods, such as GSM or GPRS, while a secondary, or additional communication method could be provided for technicians, or operators near the unit, using for example, IEEE 802.11b or Bluetooth.

Some wireless communications modules may include circuitry that can interact with the Global Positioning System (GPS). GPS can be advantageously employed in device 116 for mobile devices to allow finding the individual device 116 in a remote location. However, location sensing based upon other techniques can be used as well.

In order to convey process information from a digital process device to an analog-based process device (such as via a 4–20 mA loop) device 116 stores, in memory 52 or other suitable memory, a mapping between one or more process devices coupled to loop communicator 36 via a process industry standard communication loop, or through wireless communication module 120. For example, the mapping may include an entry that indicates that a process fluid temperature output provided by a FOUNDATION™ Fieldbus temperature transmitter coupled to loop communicator 36 should be routed to specific analog outputs 124 and 128. Moreover, the mapping can include additional hard-coded or user specified operations that device 116 performs upon received Fieldbus temperature information before setting the analog output. For example, gain and/or span can be programmatically set or changed by interacting with device 116 through communicator 36 or wireless communication module 120.

The mapping is preferably generated by a user or technician having knowledge about any connected devices (either through loop communicator 36 or through wireless communication module 120). Obtaining such knowledge may be as simple as a technician providing the information locally to device 116, or it may be obtained in an automatic detection. In one embodiment, a user of device 116 will interact with device 116 through wireless communication module 120 using any suitable wireless communication technique. Moreover, device 116 may present its configuration and/or diagnostic information to the user through wireless communication module 120 in any suitable format. One particular format is that of HTML wherein device 116 essentially provides a web interface to the technician.

Once the technician is interacting with device 116 and the knowledge about connected devices has been obtained, the device preferably generates a mapping between process variable information from a specific digital process device (such as by taking the AI.out of a FOUNDATION™ Fieldbus transmitter) and a particular analog output of device 116. In one embodiment, device 116 is able store a mapping relating 8 digital process devices to 8 distinct 4–20 mA analog outputs. However, those skilled in the art will recognize that more, or fewer, mappings can be used in accordance with embodiments of the present invention. Additionally, since each analog output can only communicate a single parameter (such as a specific current between 4 and 20 mA) additional information received by device 116 through loop communicator 36 can be conveyed to any suitable device through wireless communication module 120. Thus, the mapping stored within device 116 can relate information (such as a process temperature) from a given digital process device to a specific analog output, and any additional information from that same digital process device will be communicated to one or more devices, specified in the map, through module 120. In this way, the additional diagnostic and other information available from digital process devices can be transmitted wirelessly to a DCS or other work stations.

Figure 6:
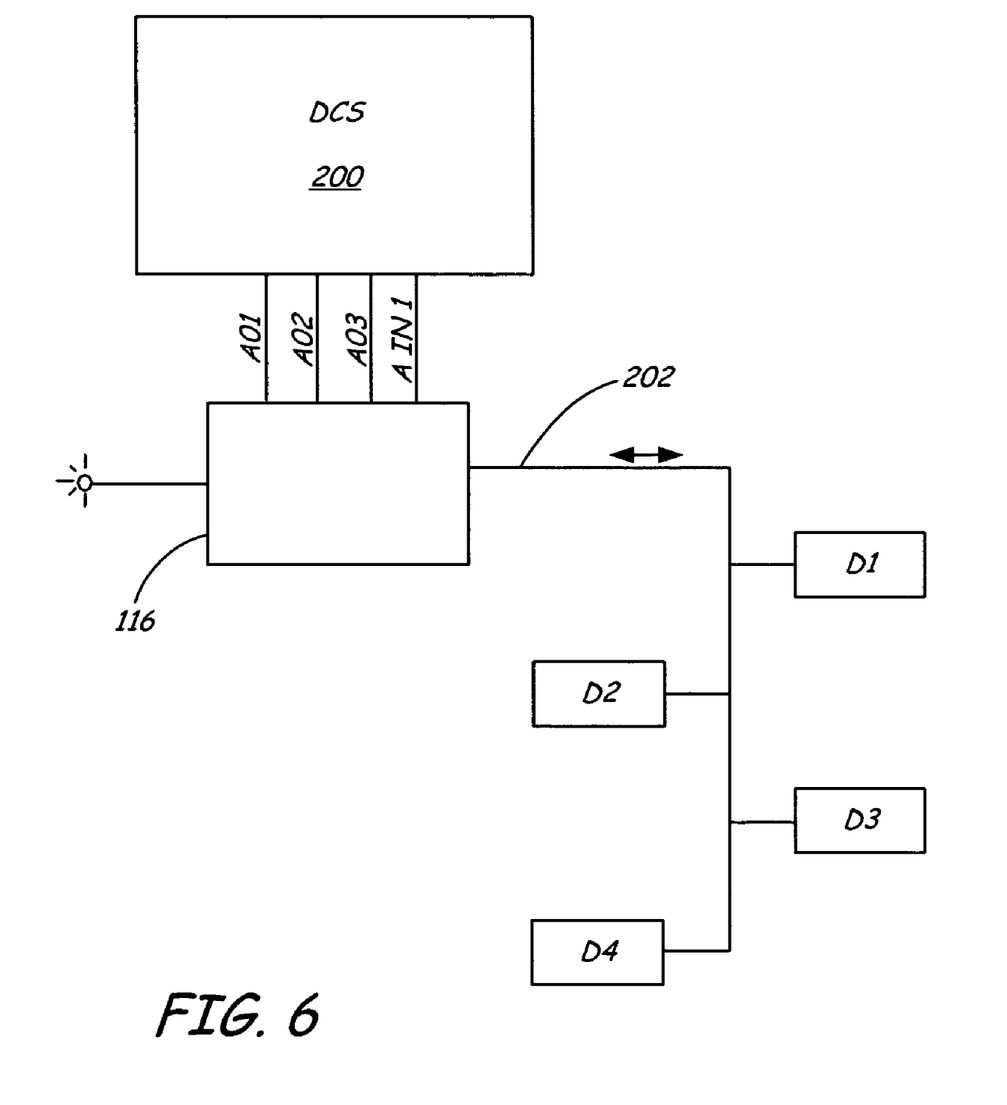
FIG. 6 is a system block diagram of a field-mountable process device operating with multiple digital process devices and a Distributed Control System (DCS).

FIG. 6 is a system block diagram of a field-mountable process device operating with multiple digital process devices and a Distributed Control System (DCS). Field-mountable process device 116 is coupled to DCS 200 via 4 distinct analog communication paths. Device 116 provides analog outputs AO1, AO2, and AO3 to DCS 200 while receiving an analog signal from DCS 200 via analog input AIn1. Device 116 is coupled to Fieldbus network 202 through loop communicator 36 (shown in FIG. 5). In the example illustrated in FIG. 6, four digital process devices are also coupled to Fieldbus network 202. Device D1 is a process fluid temperature transmitter that is operably coupled to a process fluid and transmits digital data over network 202 related to the process fluid temperature. Device D2 is a process fluid pressure transmitter that is operably coupled to a process fluid and transmits digital data over network 202 related to the process fluid pressure. Device D3 is a process fluid pH transmitter that is operably coupled to a process fluid and transmits digital data over network 202 related to the process fluid pH. Device D4 is a process fluid valve controller that controls a valve coupled thereto in response to information received over network 202.

Figure 7:
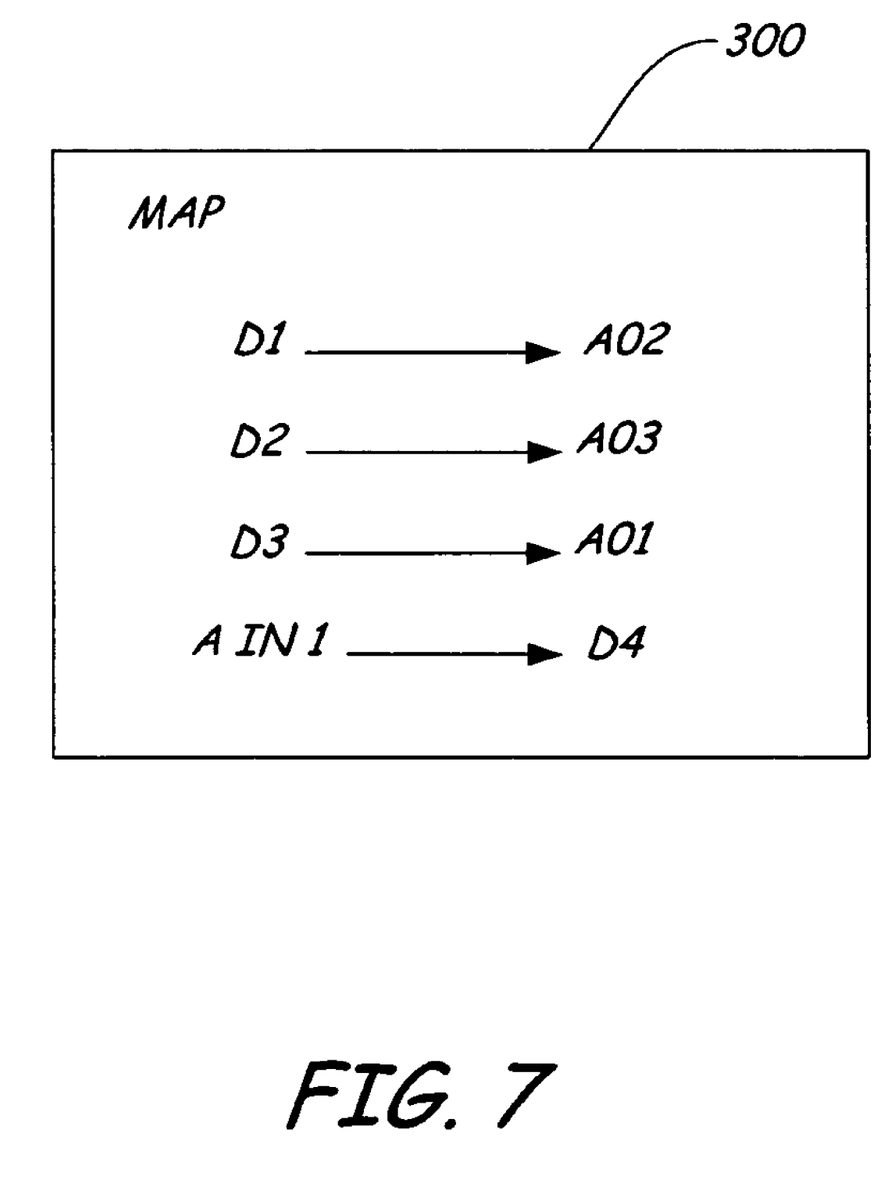
FIG. 7 is a diagrammatic view of an exemplary map in accordance with an embodiment of the present invention.

FIG. 7 is a diagrammatic view of an exemplary map in accordance with an embodiment of the present invention. Map 300 can be transmitted to device 116 or generated therein during configuration of the system. Map 300 is stored in a computer-readable medium (such as memory), preferably non-volatile, within device 116 and relates digital information from specific devices to analog inputs/outputs. For example, map 300 shows device D1 being mapped to analog output AO2. Thus, the process fluid temperature information communicated by D1 over loop 202 will be received by device 116 and translated to an analog output that is provided on analog output AO2 which is ultimately received by DCS 200. Additionally, process fluid pressure and pH, measured and communicated by devices D2 and D3, respectively, will be converted to analog signals on analog outputs AO3 and AO1, respectively. In this manner, DCS is able to receive important process variable information even though it may not be able to receive or understand FOUNDATION™ Fieldbus signals. Once DCS 200 calculates or otherwise obtains its control output, the analog control output is conveyed to device 116 via analog input AIn1 of device 116. Device 116 then converts the analog signal to a FOUNDATION™ Fieldbus signal that gives effect to the analog control signal and conveys the digital signal over loop 202 to valve controller D4.

Map 300 can also be changed by a user or field technician either by interacting with device 116 locally, or via its wireless communication module 120. In fact, in embodiments where HART-compatible devices are coupled to an analog output module of device 116, such HART-compatible devices can be configured remotely via wireless communication module 120 of device 116.

Figure 8:
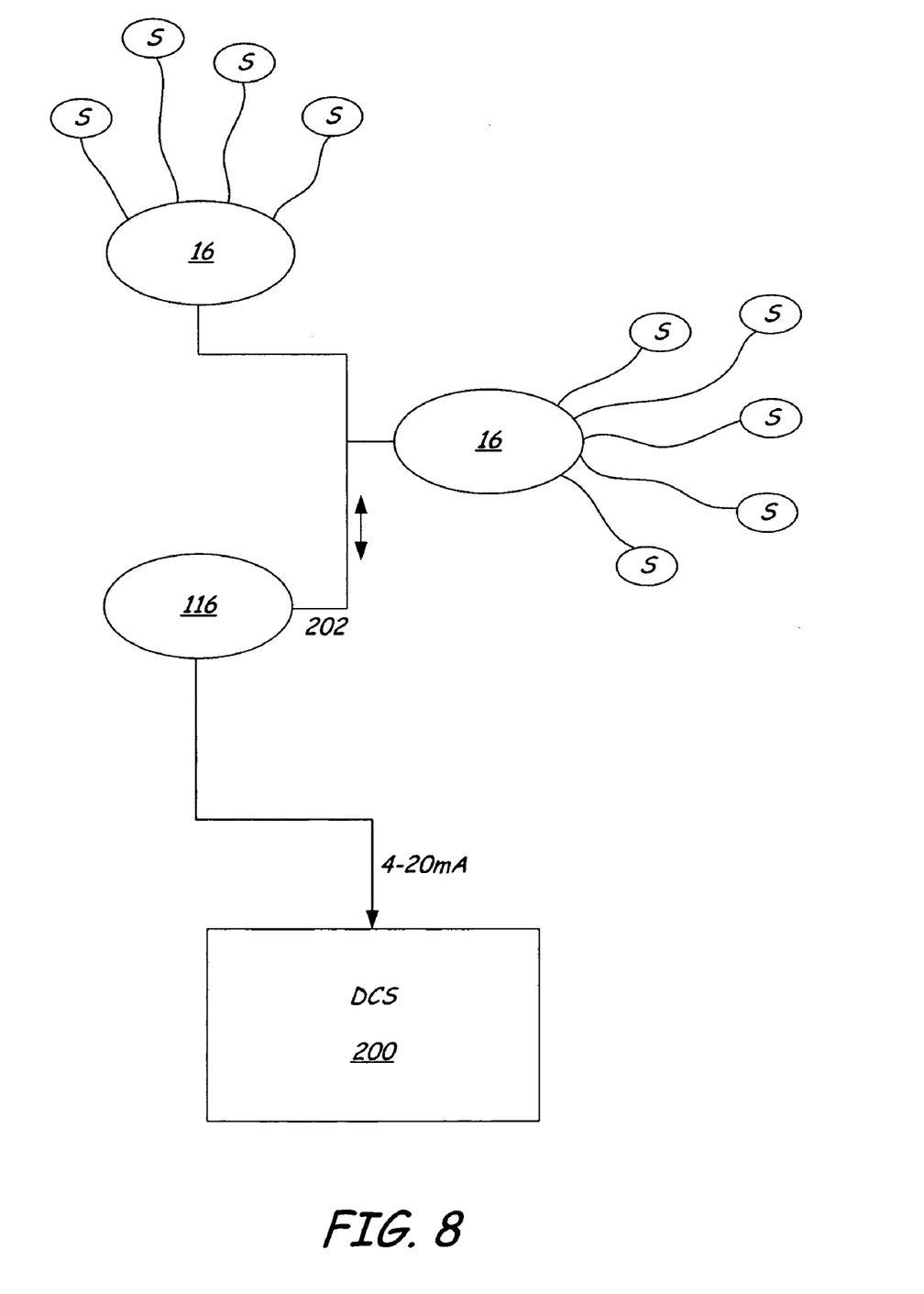
FIG. 8 is a diagrammatic view of three field-mountable process devices, in accordance with embodiments of the present invention, being used to multiplex and demultiplex a number of sensor measurements into a 4–20 mA analog input of a DCS.

FIG. 8 is a diagrammatic view of three field-mountable process devices, in accordance with embodiments of the present invention, being used to multiplex and demultiplex a number of sensor measurements into a 4–20 mA analog input of a DCS. System 400 includes a pair of field-mountable process devices 16 (described above with respect to FIG. 2) coupled to another field-mountable process device 116 over a digital process communication loop 202. When so configured, device 116 can request select a device 16 and a specific sensor coupled thereto for reading. Then the result of the measurement can be converted into an analog current and provided to DCS 200. Additional data can also be conveyed by device 116 via wireless communication module 120 (not shown in FIG. 8.

While the description thus far has focused upon mapping discrete digital process devices to individual analog inputs or outputs of a field-mountable process device, embodiments of the present invention also include mapping a plurality of parameters provided by a single digital process device to multiple analog inputs/outputs. For example, a process fluid temperature transmitter may have its process variable output mapped to a first analog output, while having another quantity, such as measurement confidence mapped to a second analog output.

It is believed that embodiments of the present invention will allow analog based control systems to interact with new digital process devices. Moreover, digital information beyond the process variables can be provided to one or more selectable digital devices thereby taking advantage of the digital communication capabilities of digitally communicating process devices.

Although the present invention has been described with reference to embodiments of two-wire process device having four channels, workers skilled in the art will recognize that changes may be made in form and detail without departing from the spirit and scope of the invention, which are defined by the appended claims. For example, although various modules have been illustrated and described separately, it is expressly contemplated that some such modules can be physically embodied together, such as on an Application Specific Integrated Circuit. Further, although controller 40 is described as a single module, its functions can be distributed upon multiple microprocessors such that one microprocessor could provide low-level I/O interaction, such as calibration, linearization and the like, while a second microprocessor executes the user-generated control algorithm. Additionally, although the description has focussed upon inputs and outputs being provided through the disclosed channels, it is expressly contemplated that some process inputs or process outputs could be communicated from/to other process devices through the process control loop.

What is claimed is:

1. A field-mountable process device comprising:
a loop communicator configured to couple to a process communication loop and communicate digitally over the loop;
memory configured to store a map relating a first digital parameter relative to a first digital process device coupled to the process communication loop to a first analog module and a second digital parameter to a second analog module;
a controller coupled to the loop communicator and configured to convert between the first parameter and first analog signal information and to convert between the second digital parameter and second analog signal information;
a first analog module operably coupled to the controller and configured to convey a first analog signal related to the first analog signal information; and
a second analog module operably coupled to the controller and configured to convey a second analog signal related to the second analog signal information.

2. The device of claim 1, wherein the first analog module is an analog output module.

3. The device of claim 2, wherein the first analog module includes a HART digital communication chip.

4. The device of claim 2, wherein the second analog module is an analog output module.

5. The device of claim 2, wherein the second analog module is an analog input module.

6. The device of claim 1, wherein the first and second analog modules are analog input modules.

7. The device of claim 1, and further comprising a power module configured to coupled to the process communication loop and wholly power the device with power received from the loop.

8. The device of claim 1, wherein the loop communicator is a FOUNDATION Fieldbus communicator.

9. The device of claim 1, and further comprising a wireless communication module coupled to the controller.

10. The device of claim 9, wherein the device is configurable through the wireless communication module.

11. The device of claim 10, wherein the first process device provides additional digital information through the loop communicator, and wherein the controller causes the wireless communication module to transmit based on the additional digital information.

12. The device of claim 1, wherein the map is changeable.

13. The device of claim 12, wherein the map is changeable via the wireless communication module.

14. The device of claim 1, wherein the first analog module relates a 4–20 mA analog signal to first analog signal information.

15. The device of claim 1, wherein the controller is further configured to perform an operation upon the first parameter.

16. The device of claim 15, wherein the additional operation is specified in the map.

17. The device of claim 1, wherein the controller relates performs a control function and generates a control output based on the control function.

18. The device of claim 17, wherein the control output is conveyed through the loop communicator.

19. The device of claim 1, wherein the second digital parameter relates to a second digital process device coupled to the process communication loop.

20. A computer readable medium within a field-mountable process device, the computer readable medium comprising:
a first relationship relating a first digital process device with a first analog module of the field-mountable process device; and
a second relationship relating a digital process device with a second analog module of the field-mountable process device.

21. A process control system comprising:
a distributed control system having at least one analog communication channel;
a field-mountable process device having an analog module coupled to the at one analog communication channel of the distributed control system, and having a loop communicator coupled to a digital process communication loop; and at least one process device coupled to the digital process communication loop; and wherein the field-mountable process device converts between analog signals conveyed along the at least one analog channel, and digital signals conveyed through the loop communicator to or from the at least one process device.

* * * * *